(12) United States Patent
Dono et al.

(10) Patent No.: US 12,394,993 B2
(45) Date of Patent: Aug. 19, 2025

(54) PROTECTIVE APPARATUS, ENERGY STORAGE APPARATUS, AND METHOD FOR PROTECTING ENERGY STORAGE DEVICE

(71) Applicant: GS Yuasa International Ltd., Kyoto (JP)

(72) Inventors: Kazunori Dono, Kyoto (JP); Atsushi Fukushima, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 941 days.

(21) Appl. No.: 17/440,765

(22) PCT Filed: Mar. 10, 2020

(86) PCT No.: PCT/JP2020/010233
§ 371 (c)(1),
(2) Date: Sep. 18, 2021

(87) PCT Pub. No.: WO2020/195780
PCT Pub. Date: Oct. 1, 2020

(65) Prior Publication Data
US 2022/0200307 A1   Jun. 23, 2022

(30) Foreign Application Priority Data
Mar. 22, 2019   (JP) .................................. 2019-054429

(51) Int. Cl.
*H02J 7/00*   (2006.01)
*H01M 10/42*   (2006.01)
(Continued)

(52) U.S. Cl.
CPC ......... *H02J 7/00304* (2020.01); *H01M 10/48* (2013.01); *H01M 50/574* (2021.01);
(Continued)

(58) Field of Classification Search
None
See application file for complete search history.

(56) References Cited

U.S. PATENT DOCUMENTS 5,994,790 A   11/1999   Nagashima et al.
6,369,460 B1   4/2002   Endoh et al.
(Continued)

FOREIGN PATENT DOCUMENTS

JP   H10-282159 A   10/1998
JP   2000-308276 A   11/2000
(Continued)

OTHER PUBLICATIONS

International Search Report (ISR) (PCT Form PCT/ISA/210), in PCT/JP2020/010233, dated Apr. 7, 2020.

*Primary Examiner* — Jonathan Crepeau
(74) *Attorney, Agent, or Firm* — MCGINN I.P. LAW GROUP, PLLC

(57) ABSTRACT

A protective apparatus of an energy storage device includes a current breaker that interrupts the current of the energy storage device, and a control part. There are a plurality of conditions having different current thresholds and cumulative thresholds, and the control part calculates a cumulative value N of times during which the current exceeds any one of the current thresholds Is, and executes current interruption processing of interrupting the current when the calculated cumulative value N exceeds one of the cumulative thresholds Ns associated with the current threshold Is.

6 Claims, 14 Drawing Sheets

(51) Int. Cl.
   *H01M 10/48* (2006.01)
   *H01M 50/574* (2021.01)
   *H01M 50/583* (2021.01)
   *H02H 3/02* (2006.01)
   *H02H 3/08* (2006.01)
   *H02H 3/093* (2006.01)
   *H02H 7/18* (2006.01)

(52) U.S. Cl.
   CPC .......... *H01M 50/583* (2021.01); *H02H 3/021* (2013.01); *H02H 3/08* (2013.01); *H02H 3/093* (2013.01); *H02H 7/18* (2013.01); *H02J 7/0047* (2013.01); *H01M 2010/4278* (2013.01)

(56) References Cited

U.S. PATENT DOCUMENTS

| | | |
|---|---|---|
| 2010/0134939 A1 | 6/2010 | Takahashi et al. |
| 2017/0194670 A1 | 7/2017 | Kawano et al. |

FOREIGN PATENT DOCUMENTS

| | | |
|---|---|---|
| JP | WO2007/074837 A1 | 6/2009 |
| JP | 2012-044844 A | 3/2012 |
| JP | 2013-070506 A | 4/2013 |
| JP | 2015-083404 A | 4/2015 |
| JP | 2015-195653 A | 11/2015 |
| JP | WO2015/182515 A1 | 4/2017 |
| JP | 2017-208983 A | 11/2017 |
| JP | 2018-182992 A | 11/2018 |

Fig. 10

|  | Current threshold Is | Cumulative threshold Ns | Reset time TR |
|---|---|---|---|
| Current interruption condition 1 | 1450 A | 10 msec | 1 sec |
| Current interruption condition 2 | 900 A | 2 sec | 1 sec |
| Current interruption condition 3 | 700 A | 40 sec | 1 sec |
| Current interruption condition 4 | 300 A | 60 sec | 1 sec |

Fig. 14

|  | Current threshold Is | Cumulative threshold Ts | Detection period W |
|---|---|---|---|
| Current interruption condition 1 | 1450 A | 10 msec | 15 msec |
| Current interruption condition 2 | 900 A | 2 sec | 3 sec |
| Current interruption condition 3 | 700 A | 40 sec | 60 sec |
| Current interruption condition 4 | 300 A | 60 sec | 90 sec |

PROTECTIVE APPARATUS, ENERGY STORAGE APPARATUS, AND METHOD FOR PROTECTING ENERGY STORAGE DEVICE

TECHNICAL FIELD

The present invention relates to a technique for protecting an energy storage device from an overcurrent.

BACKGROUND ART

The energy storage apparatus may be short-circuited between terminals by a tool at the time of assembling work or the like. The energy storage apparatus includes a current breaker such as a relay or a field-effect transistor (FET), and interrupts a current when a short circuit occurs to protect components constituting the energy storage apparatus. Patent Document 1 below describes that when a current continuously exceeds a current threshold for a time longer than a predetermined time, the current is interrupted.

PRIOR ART DOCUMENT

Patent Document

Patent Document 1: WO 2015/182515

SUMMARY OF THE INVENTION

Problems to be Solved by the Invention

In a case where the interruption of a current is determined based on a duration in which a current equal to or larger than a current threshold continuously flows, it may not be possible to interrupt a discontinuous overcurrent in which a current temporarily falls below the current threshold. When there is only one current interruption condition, the current can be interrupted only under one condition, so that the protection of the energy storage device may be insufficient.

An object of the present invention is to protect an energy storage apparatus by interrupting a current against a discontinuous overcurrent.

Means for Solving the Problems

A protective apparatus for an energy storage device according to one aspect of the present invention includes: a current breaker that interrupts a current of the energy storage device; and a control part. There are a plurality of conditions having different current thresholds and cumulative thresholds, and the control part calculates a cumulative value of times during which the current exceeds any one of the current thresholds, and executes current interruption processing of interrupting the current when the calculated cumulative value exceeds one of the cumulative thresholds associated with the current threshold.

A protective apparatus for an energy storage device according to another aspect of the present invention includes: a current breaker that interrupts a current of the energy storage device; a control part; and a communication part. There are a plurality of conditions having different current thresholds and cumulative thresholds, and the control part calculates a cumulative value of times during which the current exceeds any one of the current thresholds, and causes the communication part to transmit an alarm signal when the calculated cumulative value exceeds one of the cumulative thresholds associated with the current threshold.

The present technique can be applied to a method for protecting an energy storage device, a protection program, and a recording medium on which the protection program has been recorded.

Advantages of the Invention

According to the above aspect, a current can be interrupted to protect the energy storage device against a discontinuous overcurrent.

BRIEF DESCRIPTION OF THE DRAWINGS

FIG. 10 is an explanatory diagram of a current interruption condition.
FIG. 14 is an explanatory diagram of current interruption conditions.

MODE FOR CARRYING OUT THE INVENTION

Figure 1:
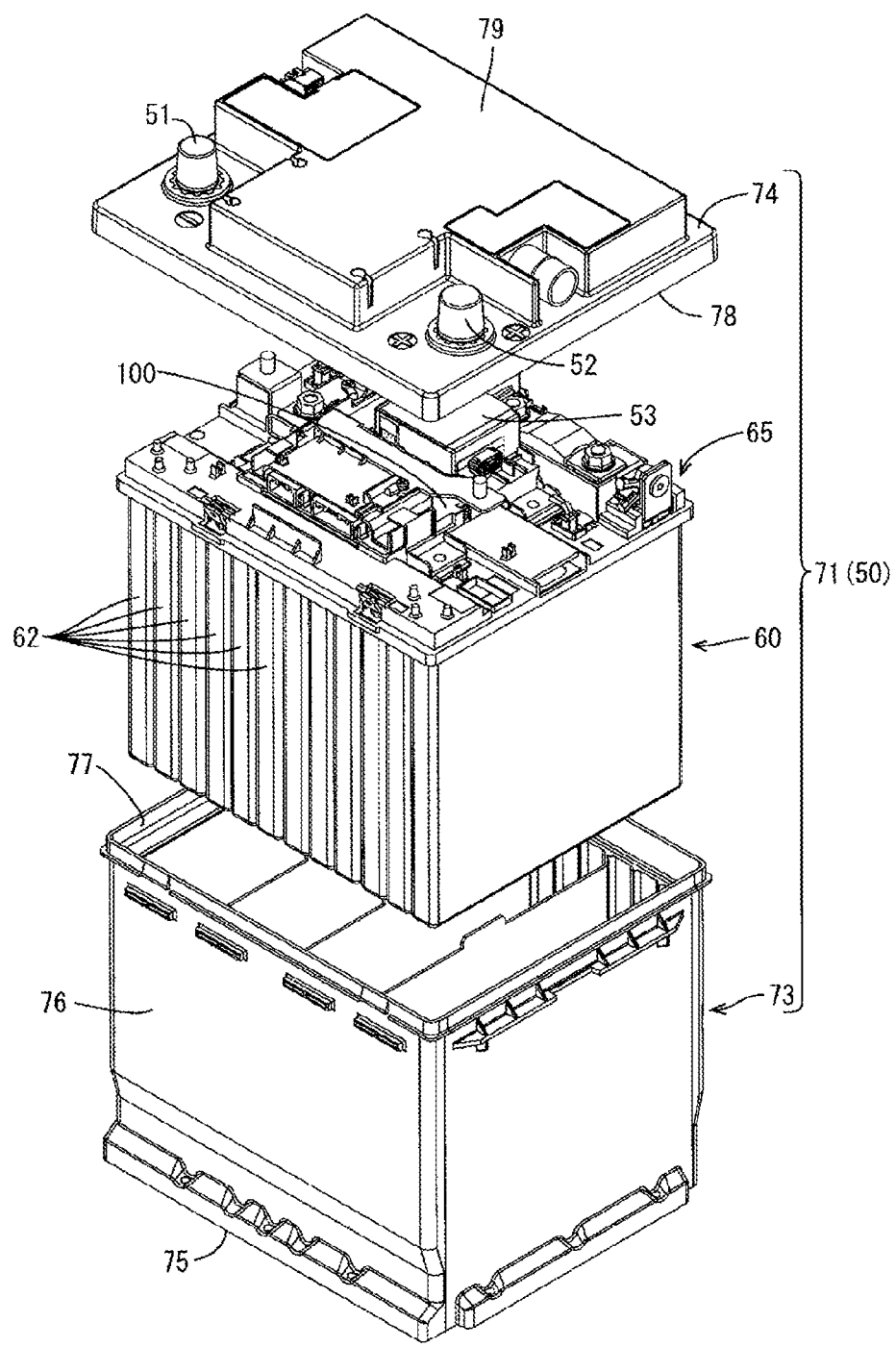
FIG. 1 is an exploded perspective view of a battery.

A protective apparatus for an energy storage device includes: a current breaker that interrupts a current of the energy storage device; and a control part. There are a plurality of conditions having different current thresholds and cumulative thresholds, and the control part calculates a cumulative value of times during which the current exceeds any one of the current thresholds, and executes current interruption processing of interrupting the current when the calculated cumulative value exceeds one of the cumulative thresholds associated with the current threshold.

When the cumulative value of times when the current threshold is exceeded exceeds the cumulative threshold, the current interruption processing is executed, so that the energy storage device can be protected from a discontinuous overcurrent. By preparing a plurality of current interruption conditions having different current thresholds and cumulative thresholds, the number of combinations of the current threshold and the cumulative threshold, with which the current can be interrupted, increases as compared to when there is only one condition. Hence, the protection performance of the energy storage device against an overcurrent can be enhanced as compared to a case where there is only one condition.

The control part may calculate a cumulative value of times during which the current exceeds the current threshold for each condition, and execute current interruption processing of interrupting the current when the calculated cumulative value exceeds the cumulative threshold associated with the current threshold under any condition. The current interruption processing is executed when the cumulative threshold is exceeded under any one of the plurality of conditions, so that the energy storage device can be protected from an overcurrent with different current values and durations.

A protective apparatus for an energy storage device includes: a current breaker that interrupts a current of the energy storage device; a control part; and a communication part. There are a plurality of conditions having different current thresholds and cumulative thresholds, and the control part calculates a cumulative value of times during which the current exceeds any one of the current thresholds, and causes the communication part to transmit an alarm signal when the calculated cumulative value exceeds one of the cumulative thresholds associated with the current threshold.

For equipment to which the energy storage apparatus supplies power (e.g., electronic or electric equipment mounted on a vehicle), it is undesirable to come into a state where the current from the energy storage apparatus be interrupted to cause a power failure. In some cases, the purpose of protecting a machine that requires power of an energy storage apparatus, such as a vehicle, is prioritized over the purpose of protecting the energy storage apparatus. In such a case, instead of executing the current interruption processing at a time point when the interruption condition is satisfied, equipment outside the energy storage apparatus is notified that the interruption condition is satisfied, that is, an alarm signal is transmitted to the equipment. In this manner, the control part can determine whether or not to execute the current interruption processing based on a purpose that should be prioritized in a situation such as an emergency in cooperation with the equipment outside the energy storage apparatus. Upon reception of the alarm signal from the energy storage apparatus, the equipment outside the energy storage apparatus can proceed with preparation for the current interruption processing and other problem-solving processing.

The current breaker may be provided in a current path connecting the energy storage device and an external terminal, and the conditions may at least include a first condition for determining that a short circuit of the external terminal occurs, and a second condition for determining that a short circuit of a load connected to the external terminal occurs. The current can be interrupted to protect the energy storage device at the time of short circuit between the external terminals or at the time of load short circuit.

The control part may count, as the cumulative value, times during which the current continuously exceeds the current threshold, and in a case where the current falls from a state of exceeding the current threshold, the control part may hold the cumulative value when a time during which the current is below the current threshold is equal to or shorter than a reset time.

When the time during which the current is below the current threshold is equal to or shorter than the reset time, the cumulative value is held. That is, the cumulative value is not reset, and thereafter, when the cumulative value exceeds the cumulative threshold, the current interruption processing is executed. It is thereby possible to protect the energy storage device from the discontinuous overcurrent.

The control part may calculate the cumulative value for each detection period, and may execute the current interruption processing when the cumulative value exceeds the cumulative threshold.

When the cumulative value exceeds the cumulative threshold within the detection period, the current interruption processing is executed. It is thereby possible to protect the energy storage device from the discontinuous overcurrent.

First Embodiment

1. Description of battery 50

As illustrated in FIG. 1, a battery 50 includes an assembled battery 60, a circuit board unit 65, and a housing 71.

The housing 71 includes a body 73 made of a synthetic resin material and a lid body 74. The body 73 has a bottomed cylindrical shape. The body 73 includes a bottom surface portion 75 and four side surface portions 76. An upper opening 77 is formed in an upper-end portion by the four side surface portions 76.

The housing 71 houses the assembled battery 60 and a circuit board unit 65. The assembled battery 60 has twelve secondary batteries 62. The twelve secondary batteries 62 are connected with three in parallel and four in series. The circuit board unit 65 is disposed in the upper portion of the assembled battery 60.

The lid body 74 closes the upper opening 77 of the body 73. An outer peripheral wall 78 is provided around the lid body 74. The lid body 74 has a protrusion 79 in a substantially T-shape in a plan view. An external terminal 51 of the positive electrode is fixed to one corner of the front portion of the lid body 74, and an external terminal 52 of the negative electrode is fixed to the other corner.

Figure 2:
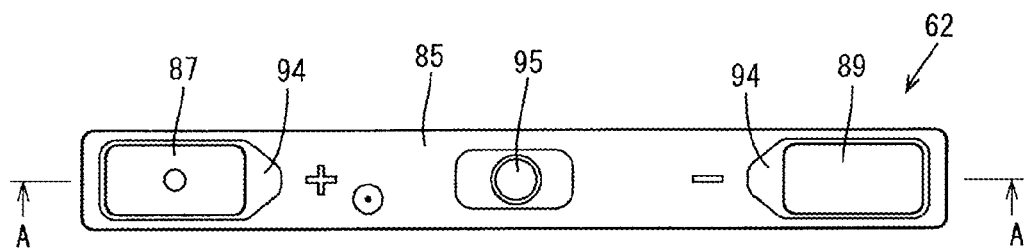
FIG. 2 is a plan view of a secondary battery.
Figure 3:
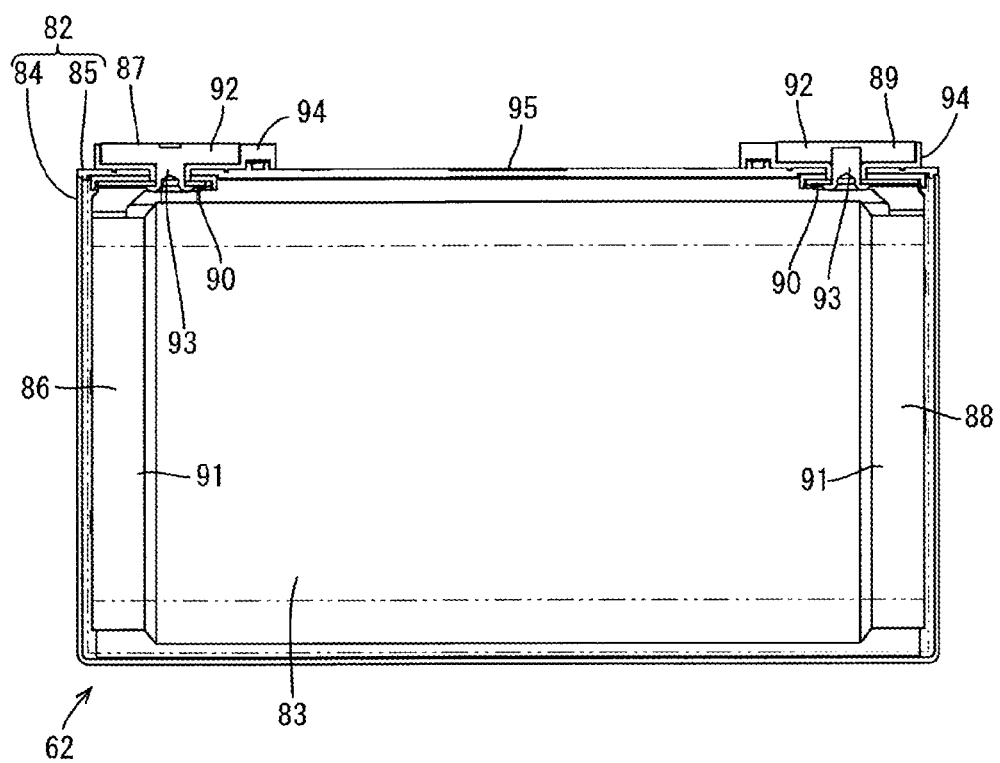
FIG. 3 is a cross-sectional view taken along line A-A in FIG. 2.

As illustrated in FIGS. 2 and 3, the secondary battery 62 houses an electrode assembly 83 together with a nonaqueous electrolyte in a case 82 having a rectangular parallelepiped shape. The secondary battery 62 is, for example, a lithium ion secondary battery. The case 82 has a case body 84 and a lid 85 for closing an opening at the top of the case body 84.

Although not illustrated in detail, the electrode assembly 83 has a separator, made of a porous resin film, disposed between a negative electrode element formed by applying an active material to a substrate made of copper foil and a positive electrode element formed by applying an active material to a substrate made of aluminum foil. These are all belt-shaped, and are wound in a flat shape so as to be able to be housed in the case body 84 in a state where the negative electrode element and the positive electrode element are displaced from each other on the opposite sides in the width direction with respect to the separator.

The positive electrode element is connected to a positive electrode terminal 87 via a positive current collector 86, and the negative electrode element is connected to a negative electrode terminal 89 via a negative current collector 88. Each of the positive current collector 86 and the negative current collector 88 is made up of a plate-shaped base 90 and legs 91 extending from the base 90. A through hole is formed in the base 90. The leg 91 is connected to the positive electrode element or the negative electrode element. Each of the positive electrode terminal 87 and the negative electrode terminal 89 is made up of a terminal body portion 92 and a shaft 93 protruding downward from the center portion of the lower surface of the terminal body portion 92. Among those, the terminal body portion 92 and the shaft 93 of the positive electrode terminal 87 are integrally formed of aluminum (single material). The negative electrode terminal 89 has the terminal body portion 92 made of aluminum and the shaft 93 made of copper and is assembled with these. The terminal body portions 92 of the positive electrode terminal 87 and the negative electrode terminal 89 are disposed at both ends of the lid 85 via gaskets 94 made of an insulating material and are exposed outward from the gaskets 94.

The lid 85 has a pressure release valve 95. As illustrated in FIG. 2, the pressure release valve 95 is located between the positive electrode terminal 87 and the negative electrode terminal 89. The pressure release valve 95 is opened when the internal pressure of the case 82 exceeds a limit value to lower the internal pressure of the case 82.

Figure 4:
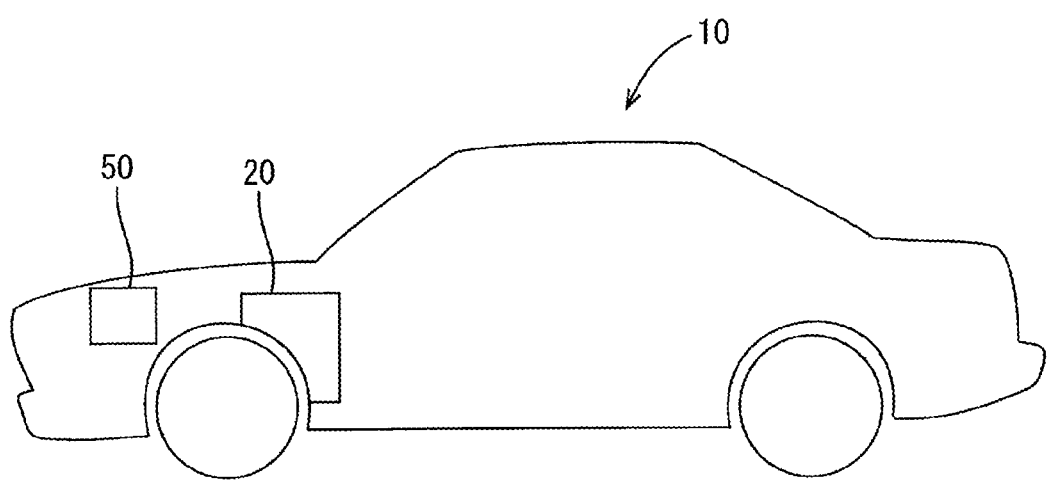
FIG. 4 is a side view of a vehicle.

As illustrated in FIG. 4, the battery 50 can be used by being mounted on a vehicle 10. The battery 50 may be for starting an engine 20 mounted on the vehicle 10. The vehicle 10 may be an automobile or a motorcycle.

Figure 5:
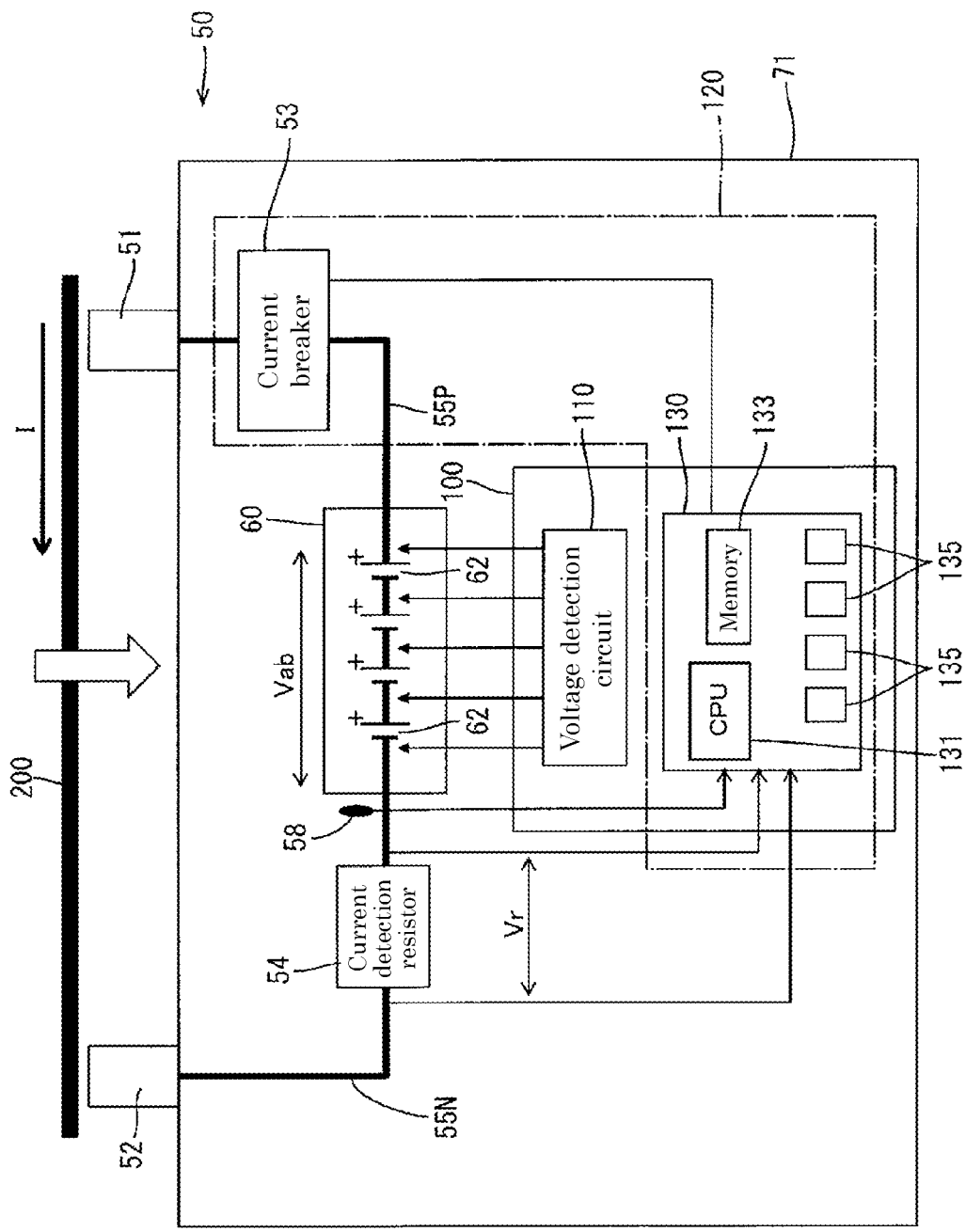
FIG. 5 is a block diagram illustrating the electrical configuration of the battery.

FIG. 5 is a block diagram illustrating the electrical configuration of the battery 50. The battery 50 includes an assembled battery 60, a current detection resistor 54, a current breaker 53, a voltage detection circuit 110, a management part 130, and a temperature sensor 58 that detects the temperature of the assembled battery 60.

The assembled battery 60 includes a plurality of secondary batteries 62. The twelve secondary batteries 62 are connected with three in parallel and four in series. In FIG. 5, three secondary batteries 62 connected in parallel are represented by one battery symbol. The secondary battery 62 is an example of the "energy storage device". The battery 50 is rated at 12 V. In the battery 50 rated at 12 V, the distance between the external terminal 51 of the positive electrode and the external terminal 52 of the negative electrode tends to be narrow, and at the time of assembling the battery 50 to the vehicle or some other time, a short circuit (dead short circuit) between the terminals due to a metal material such as a tool is likely to occur as compared to a larger energy storage apparatus.

The assembled battery 60, the current breaker 53, and the current detection resistor 54 are connected in series via a power line 55P and a power line 55N. The power line 55P and the power line 55N are examples of current paths.

The power line 55P is a power line for connecting the external terminal 51 of the positive electrode and the positive electrode of the assembled battery 60. The power line 55N is a power line for connecting the external terminal 52 of the negative electrode to the negative electrode of the assembled battery 60.

The current breaker 53 is located on the positive electrode side of the assembled battery 60 and is provided on the power line 55P on the positive electrode side. The current breaker 53 is a semiconductor switch such as FET or a relay. By opening the current breaker 53, the current of the battery 50 can be interrupted. The current breaker 53 is controlled so as to be closed in a normal state.

The current detection resistor 54 is located on the negative electrode side of the assembled battery 60 and provided on the power line 55N on the negative electrode. A current I of the assembled battery 60 can be measured by detecting a voltage Vr between both ends of the current detection resistor 54.

The voltage detection circuit 110 can detect a voltage V of each secondary battery 62 and a total voltage Vab of the assembled battery 60.

The management part 130 is mounted on the circuit board 100 and includes a CPU 131, a memory 133, and four counters 135. The management part 130 performs monitoring processing for the battery 50 based on the outputs of the voltage detection circuit 110, the current detection resistor 54, and the temperature sensor 58.

Figure 6:
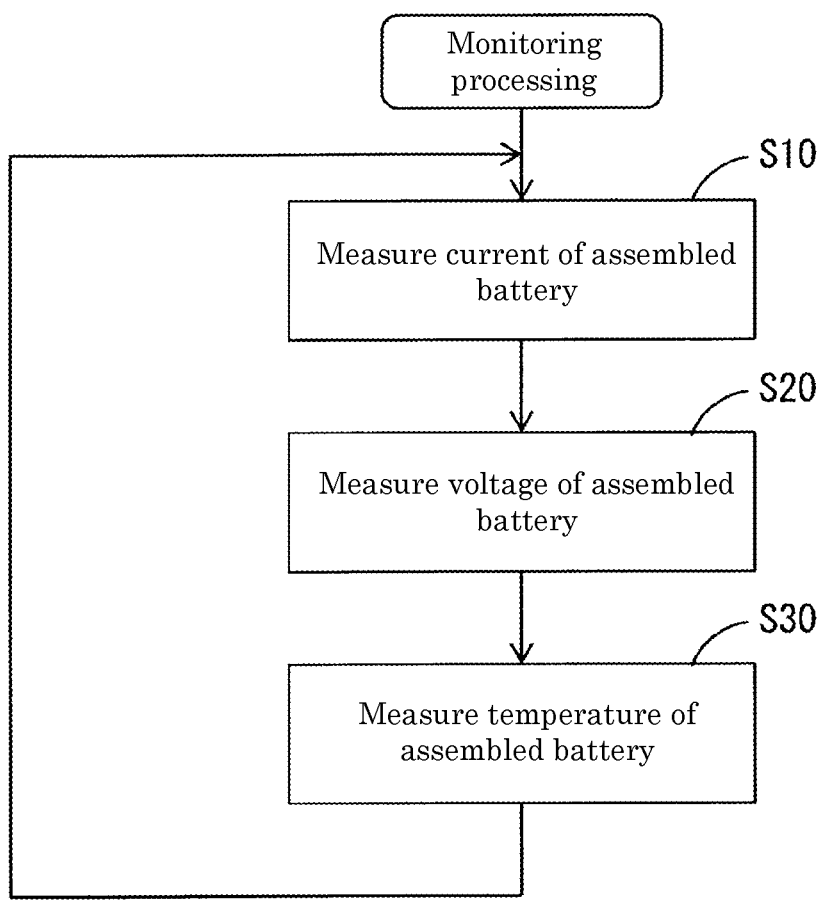
FIG. 6 is a flowchart of monitoring processing.

FIG. 6 is a flowchart of the monitoring processing for the battery 50. The monitoring processing for the battery 50 includes S10 to S30. The monitoring processing for the battery 50 is always executed at a predetermined measurement cycle during the activation of the management part 130 regardless of whether or not the battery 50 is mounted on the vehicle 10.

In S10, the management part 130 measures the current I of the assembled battery 60 based on the voltage Vr between both ends of the current detection resistor 54. The management part 130 measures the voltage V of each secondary battery 62 based on the output of the voltage detection circuit 110 in S20, and measures the temperature of the assembled battery 60 based on the output of the temperature sensor 58 in S30.

The management part 130 operates using the assembled battery 60 as a power source, and constantly monitors the state of the battery 60 based on the data of the current I, the voltage V, and the temperature measured at a predetermined measurement cycle so long as there is no abnormality such as the total voltage Vab of the assembled battery 50 falling below the operating voltage.

When the abnormality of the battery 50 is detected, the management part 130 gives a command to the current breaker 53 to interrupt the current I and performs the protection operation for the battery 50. The current breaker 53 and the management part 130 are a protective apparatus 120 of the battery 50. The management part 130 is an example of a control part.

2. External Short Circuit and Battery Protection

When a metal material such as a tool 200 short-circuits the two external terminals 51, 52 during assembling work or the like, an overcurrent flows through the assembled battery 60. When the overcurrent flows, the assembled battery 60 abnormally generates heat. The value of the overcurrent at the time of discharge due to an external short circuit is much larger than the current value in the case of charge abnormality. However, at the time of starting the engine or the like, a very large current value is measured while the discharge is normal. Therefore, at the time of discharge, it is not easy to determine whether an abnormality such as an external short circuit has occurred, or the energy storage apparatus is normally operating from only the current value. The dead short circuit caused by the tool 200 or the like may occur intermittently such that the tool 200 is instantaneously separated from the external terminals 51, 52 and comes into contact therewith again. Even when the dead short circuit is instantaneously released, the state of the battery 50 does not recover immediately, and damage remains in the battery 50 such that the state of charge (SOC) has deteriorated remarkably.

Figure 7:
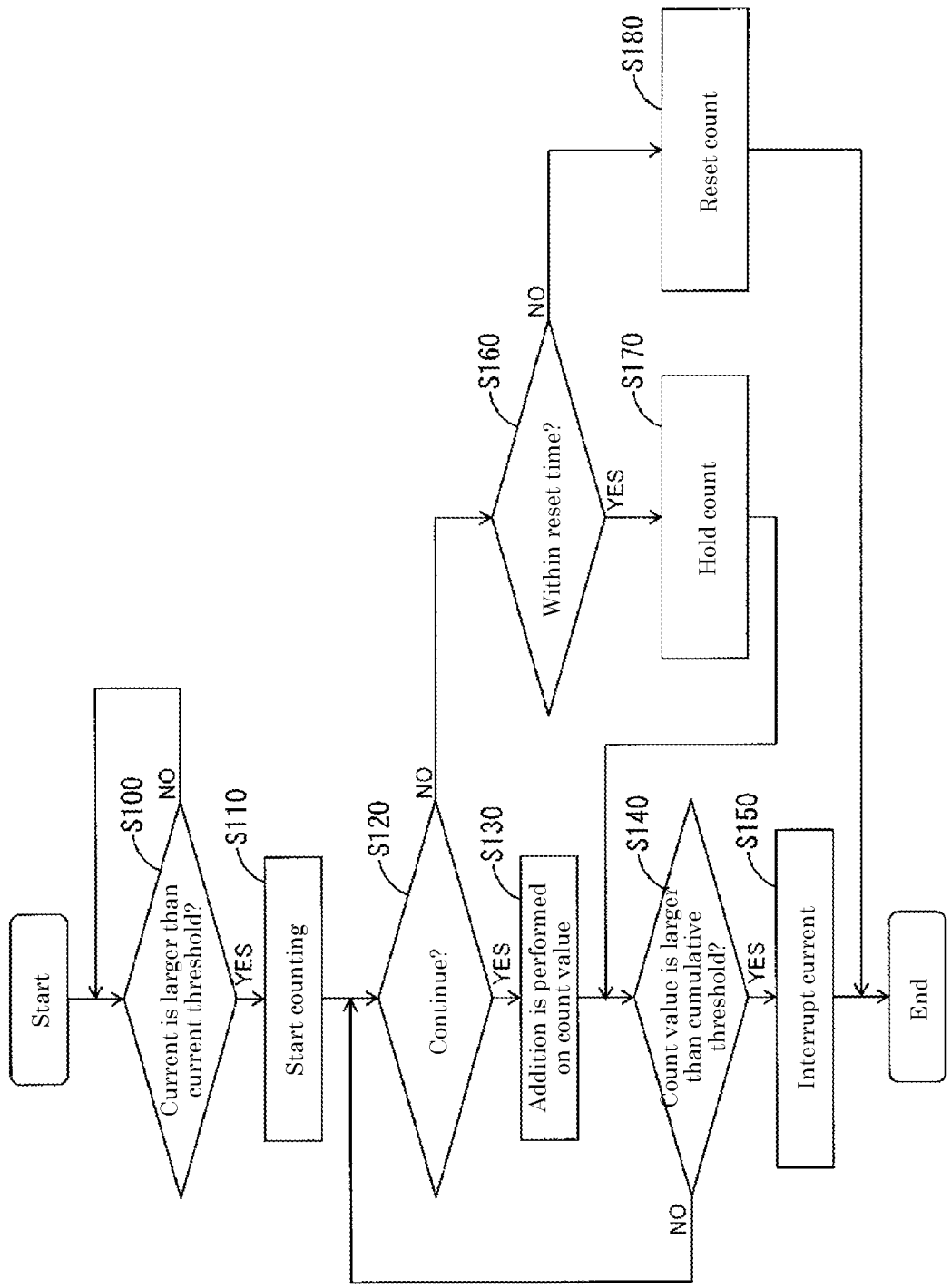
FIG. 7 is a flowchart of protection processing.

FIG. 7 is a flowchart of protection processing for the battery 50. The protection processing for the battery 50 includes S10 to S180. The protection processing for the battery 50 is always executed during the activation of the management part 130 regardless of whether or not the battery 50 is mounted on the vehicle 10.

In step S100, the management part 130 compares the current I measured in the monitoring processing with a current threshold Is. When the current I is equal to or smaller than the current threshold Is (S100: NO), the comparison processing in S100 is executed every time the current measurement is performed in the monitoring processing. The current threshold Is is a threshold for determining whether or not the current I is an overcurrent.

In the case of the overcurrent (S100: YES), the processing proceeds to S110. When the processing proceeds to S110, the management part 130 starts counting by the counter 135. The counter 135 is for measuring a cumulative time during which the overcurrent is flowing.

After the counting is started, the processing proceeds to S120. When the processing proceeds to S120, the management part 130 compares the current I measured in the next measurement cycle of the monitoring processing with the current threshold Is and determines whether the overcurrent continues.

When the overcurrent continues (S120: YES), the processing proceeds to S130. When the processing proceeds to S130, the management part 130 adds "+1" to a count value N of the counter 135.

Thereafter, in S140, the management part 130 compares the count value N with a cumulative threshold Ns. When the count value N is smaller than the cumulative threshold Ns (S140: NO), the processing returns to S120. The cumulative threshold Ns is a threshold for determining the accumulation of the overcurrent.

Thereafter, when the overcurrent continues to flow, the count value N is added with "+1" for each measurement cycle of the monitoring processing. The count value N is a cumulative value of times during which the current I exceeds the current threshold Is.

When the count value N reaches the cumulative threshold Ns, YES is determined in the determination processing of S140, and the processing proceeds to S150. When the processing proceeds to S150, the management part 130 gives a command to the current breaker 53 to interrupt the overcurrent (current interruption processing).

When the overcurrent does not continue, that is, when the current I is below the current threshold Is (S120: NO), the processing proceeds to S160.

When the processing proceeds to S160, the management part 130 measures a time during which the current I is below the current threshold Is, and compares the measured time with a reset time TR.

Then, when the time during which the current is below the current threshold Is is shorter than the reset time TR, the processing proceeds to S170. When the processing proceeds to S170, the management part 130 holds the count value N.

Thereafter, the processing proceeds to S140, and when an overcurrent is detected, the management part 130 restarts the counting by the counter 135, and the count value N is subjected to the addition from the held value.

On the other hand, when the time during which the current is below the current threshold Is is longer than the reset time TR, the processing proceeds to S180. When the processing proceeds to S180, the management part 130 resets the count value N. Thereby, the count value N returns to zero.

Figure 8:
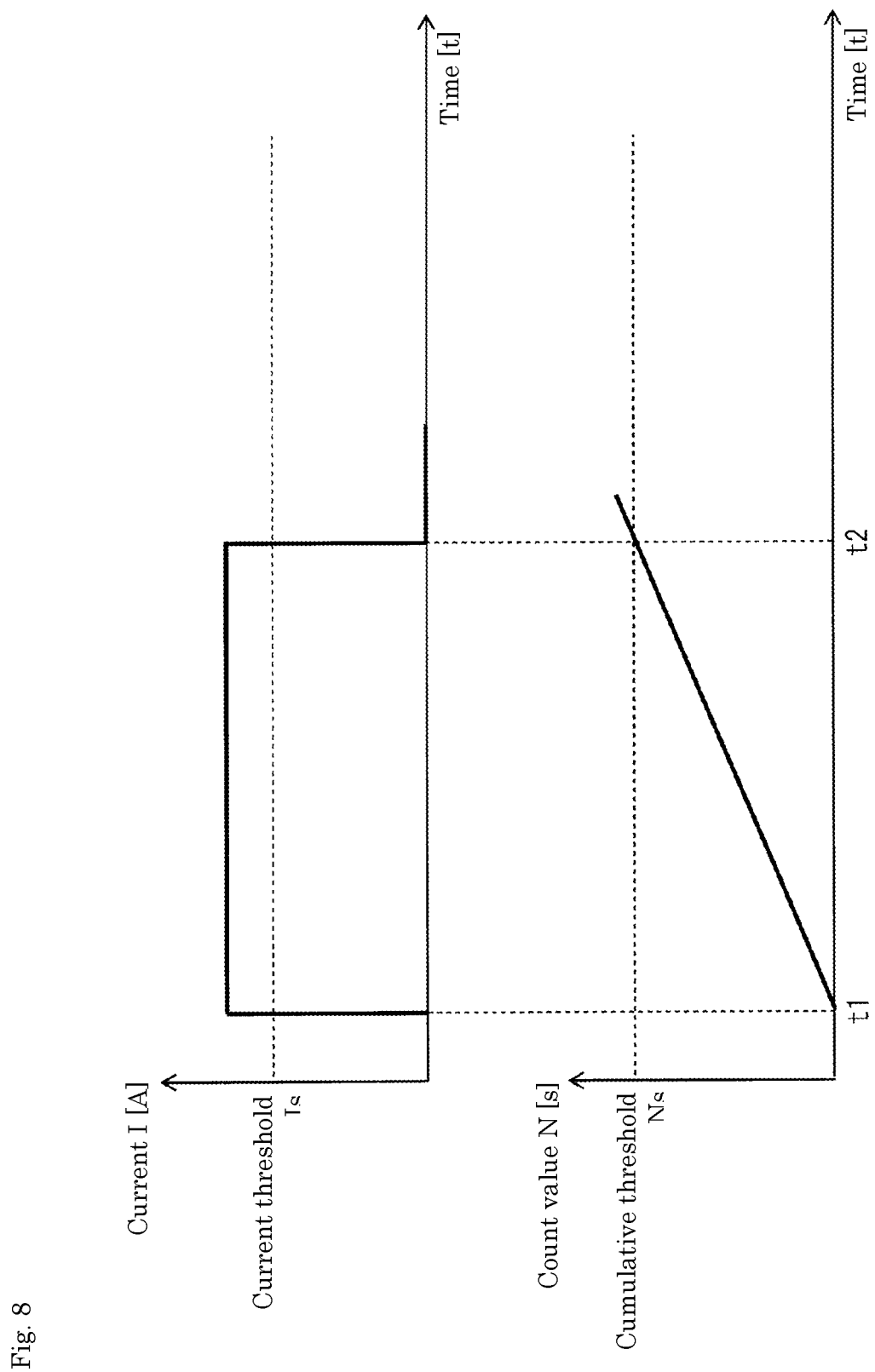
FIG. 8 is a diagram illustrating a waveform and a count value of an overcurrent.

FIG. 8 is a diagram illustrating a waveform of an overcurrent and transition of the count value N. The waveform of the overcurrent is a continuous waveform that always exceeds the current threshold Is. The count value N is cumulatively subjected to the addition to increase after time t1 at which the overcurrent starts to flow, and the count value N reaches the cumulative threshold Ns at time t2.

When the count value N reaches the cumulative threshold Ns at time t2, current interruption processing (S150) is executed by the management part 130, and the overcurrent is interrupted. The battery 50 can be protected by blocking the overcurrent.

Figure 9:
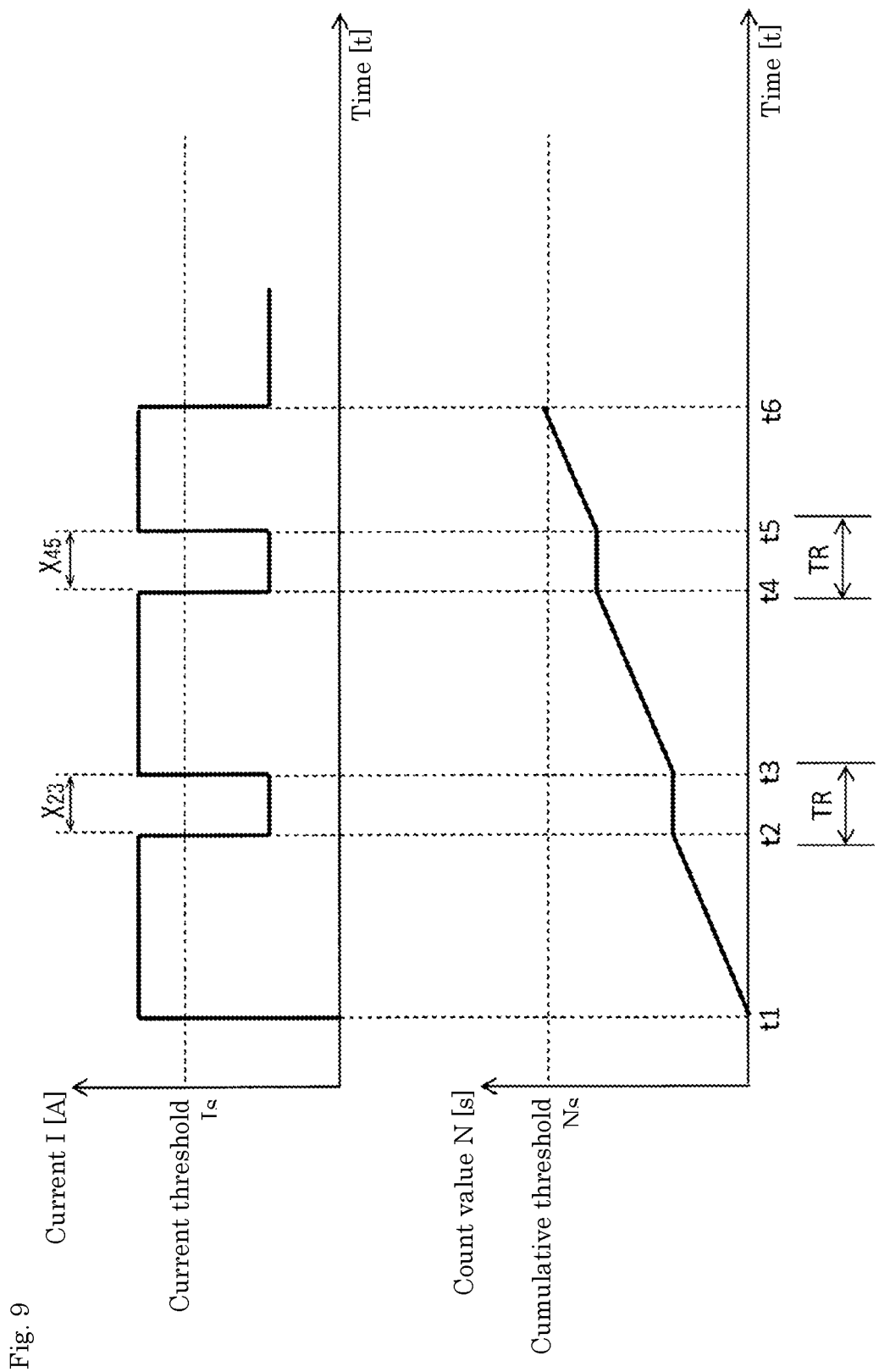
FIG. 9 is a diagram illustrating a waveform and a count value of an overcurrent.

FIG. 9 is a diagram illustrating a current waveform of an overcurrent and transition of the count value N. The waveform of the overcurrent is a discontinuous pulse-like waveform, and the current I is below the current threshold Is from t2 to t3 and from t4 to t5. The lengths of period $X_{23}$ and period $X_{45}$ are shorter than the reset time TR.

During a period from time t1 at which the overcurrent starts to flow to time t2, the current I exceeds the current threshold Is, and the count value N is subjected to the addition every time S130 is executed, to increase with the lapse of time.

In period $X_{23}$ from time t2 to time t3, the current I is below the current threshold Is, but period $X_{23}$ is shorter than the reset time TR, so that the count value N is held without being reset.

With the current I exceeding the current threshold Is during a period from time t3 to time t4, the count value N is subjected to the addition every time S130 is executed, to increase from the held value.

In period $X_{45}$ from time t4 to time t5, the current I is below the current threshold Is, but period $X_{45}$ is shorter than the reset time TR, so that the count value N is held without being reset.

With the current I exceeding the current threshold Is after time t6, the count value N is subjected to the addition every time S130 is executed, to increase from the held value. Then, the count value N reaches the cumulative threshold Ns at time t6.

When the count value N reaches the cumulative threshold Ns at time t6, current interruption processing (S150) is executed by the management part 130, and the overcurrent is interrupted.

Even when the current I is below the current threshold Is, the count value N is not reset and is held so long as the current I falls within the reset time TR. Therefore, even in a discontinuous overcurrent in which there is a period during which the current I temporarily decreases, it is possible to prevent the count value N from being reset every time the current I falls below the current threshold Is, and it is possible to interrupt the overcurrent when the count value N reaches the cumulative threshold Ns.

FIG. 10 is a diagram illustrating current interruption conditions. The current interruption condition includes items of the current threshold Is, the cumulative threshold Ns, and the reset time TR. There are four current interruption conditions 1 to 4, and the current threshold Is and the cumulative threshold Ns are different from each other. The reset time TR is common to all the conditions 1 to 4.

The current interruption condition 1 is a condition for determining that a short circuit has occurred between the two external terminals 51, 52 (or a condition for interrupting the external short circuit), and each of the current interruption conditions 2 to 4 is a condition for determining that a short circuit has occurred in a load connected to the external terminals 51, 52 (or a condition for interrupting the load short circuit). In the current interruption condition 1, the current threshold Is is 1450 A, and the cumulative threshold Ns is 10 msec. The current interruption condition 1 has a larger current threshold Is and a shorter cumulative threshold Ns than those of the current interruption conditions 2 to 4.

In the current interruption conditions 2 to 4, since the magnitude of the short-circuit current varies depending on how the load is short-circuited, the current threshold Is is set in three stages, and the smaller the current threshold Is, the longer the cumulative threshold Ns.

The management part 130 simultaneously performs the protection processing (S100 to S150) illustrated in FIG. 7 in parallel by using the four counters 135 for the current interruption conditions 1 to 4 and executes the current interruption processing of S150 to interrupt the overcurrent when the count value N reaches the cumulative threshold Ns under any of the current interruption conditions 1 to 4.

By preparing a plurality of current interruption conditions, the number of combinations of the current threshold Is and the cumulative threshold Ns increases as compared to the case of one condition. Therefore, the current I can be interrupted in any event of a short circuit of the external terminal or a load short circuit.

Second Embodiment

Figure 11:
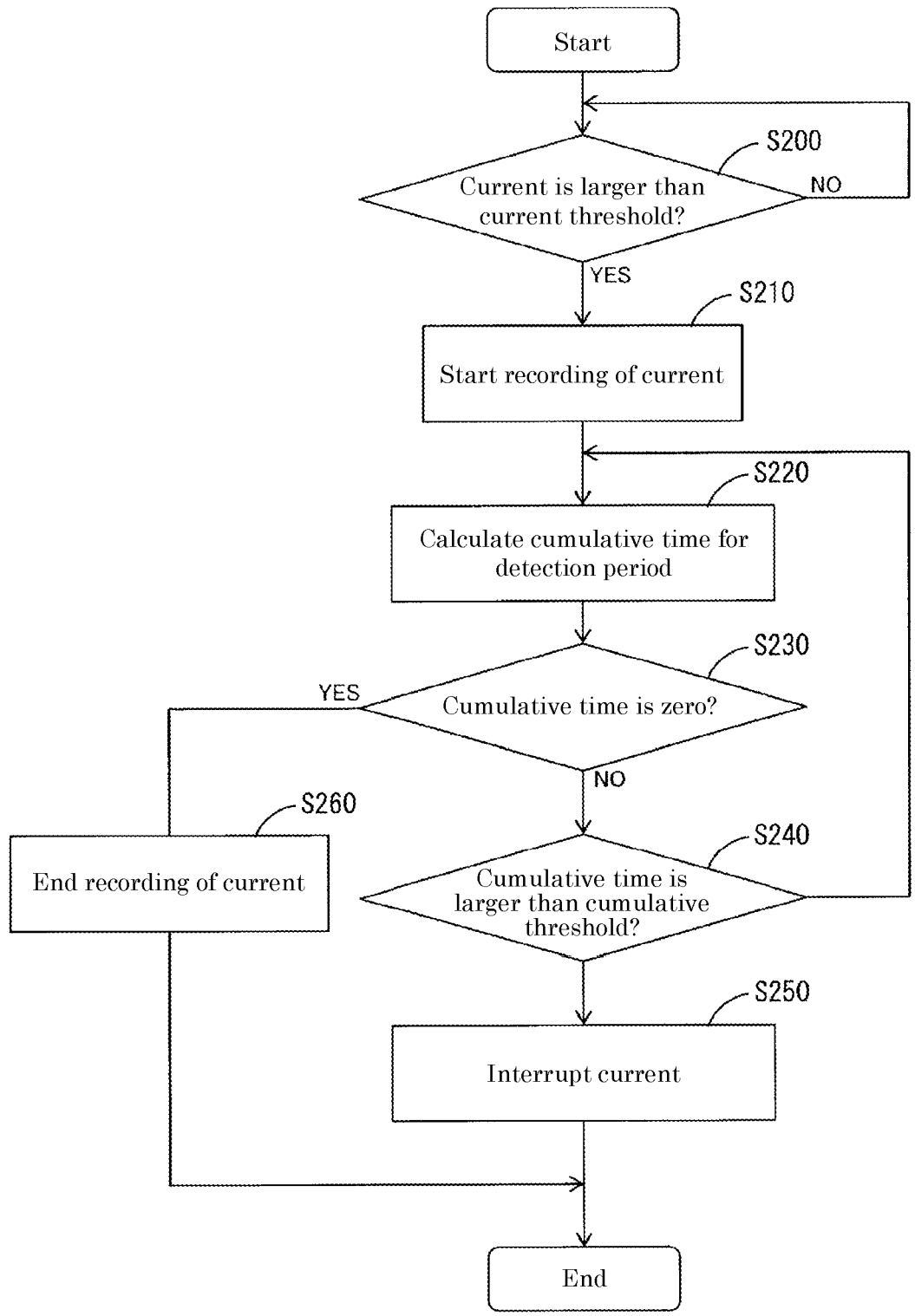
FIG. 11 is a flowchart of protection processing.

FIG. 11 is a flowchart of the protection processing for the battery 50. The protection processing for the battery 50 is always executed during the activation of the management part 130 regardless of whether or not the battery 50 is mounted on the vehicle 10.

The management part 130 compares the current I measured in the monitoring processing with the current threshold Is (S200). The current threshold Is is a threshold for determining whether or not the current I is an overcurrent.

In the case of overcurrent (S200: YES), the management part 130 starts the recording of the current I (S210). The current I is recorded in the memory 133.

After starting the recording, the management part 130 calculates a cumulative time Ta during which the overcurrent flowed in a detection period W (S220). The cumulative time Ta is a cumulative value of the times during which the current I exceeds the current threshold Is in the detection period W.

Figure 12:
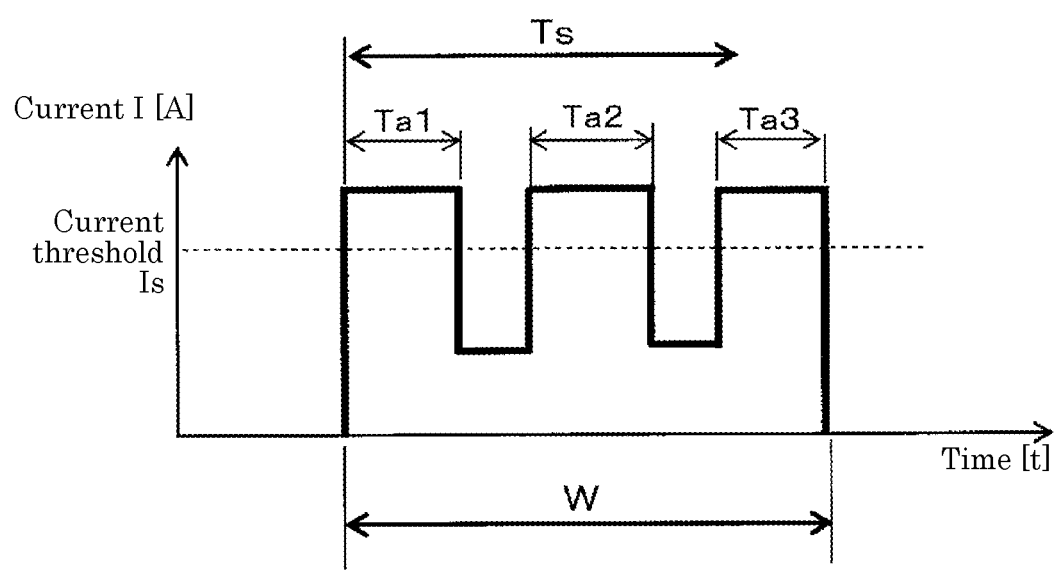
FIG. 12 is an explanatory diagram of a cumulative time.

As illustrated in FIG. 12, for example, in the detection period W, when there are three periods in which the current I exceeds the current threshold Is, the total time (Ta1+Ta2+Ta3) of three times is the cumulative time Ta.

Thereafter, the management part 130 determines whether the cumulative time Ta is 0 (S230), and when the cumulative time Ta is not 0, the management part 130 determines whether the cumulative time Ta is equal to or longer than the cumulative threshold Ts (S240).

When the cumulative time Ta is 0 (S230: YES), the management part 130 ends the recording of the current I (S260). When the cumulative time Ta is equal to or longer than the cumulative threshold Ts (S240: YES), the current interruption processing of interrupting the current I is performed by the current breaker 53 (S250).

When the cumulative time Ta is smaller than the cumulative threshold Ts (NO in S240), the processing returns to S220, and the management part 130 executes the processing of S220 to S240 for the next detection period W.

Figure 13:
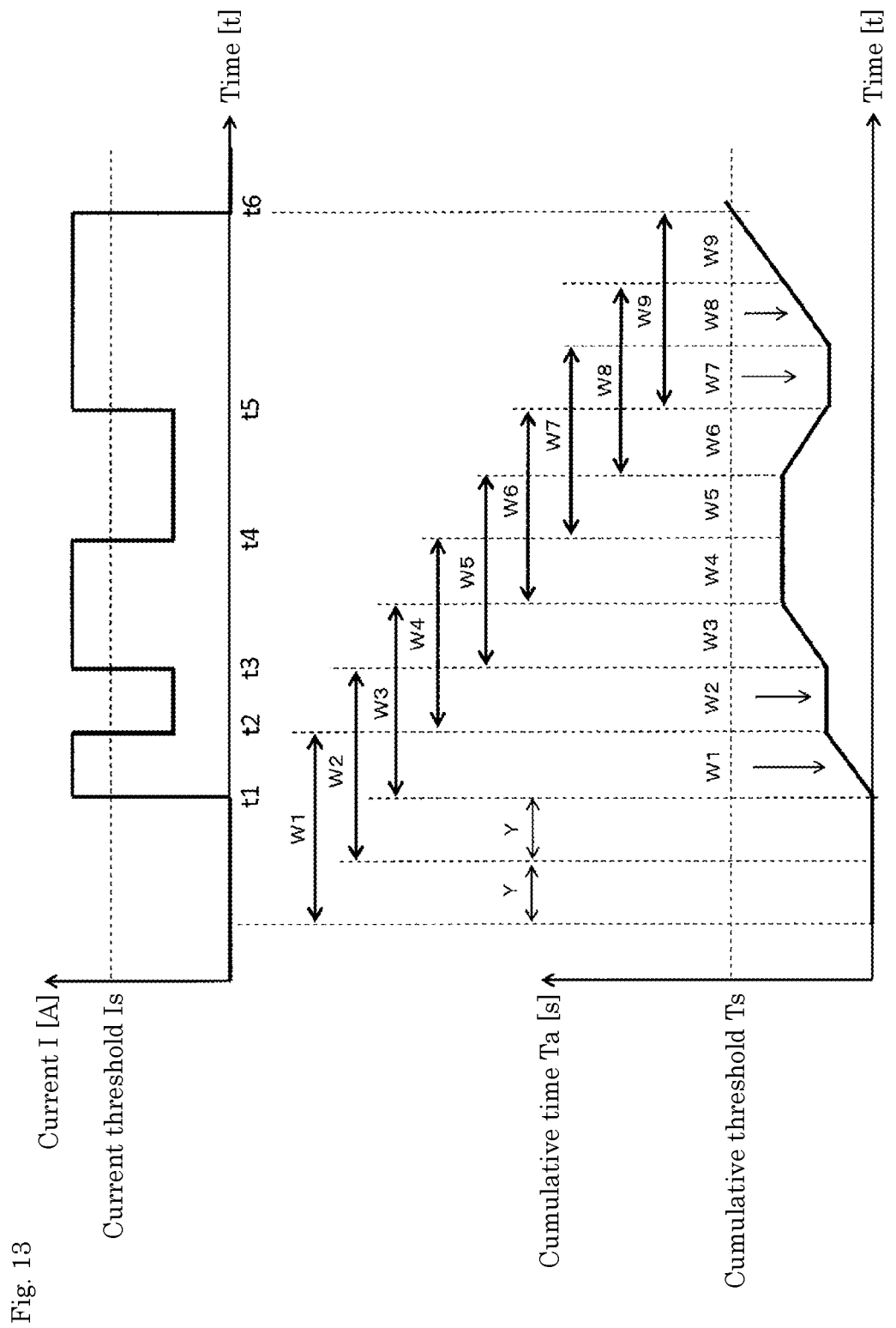
FIG. 13 is a diagram illustrating a waveform of an overcurrent and a cumulative time.

FIG. 13 is a diagram illustrating the current waveform of the overcurrent and the transition of the cumulative time Ta. The waveform of the overcurrent is a discontinuous pulse-like waveform, and the current I is below the current threshold Is from t2 to t3 and from t4 to t5.

The recording of the current I is started from time t1 when the current I exceeds the current threshold Is. The management part 130 calculates the cumulative time Ta for the detection period W1 and compares the cumulative time Ta with the cumulative threshold value Ts. When the cumulative time Ta does not exceed the cumulative threshold Ts, the cumulative time Ta is calculated and compared with the cumulative threshold Ts for the next detection period W2.

The cumulative time Ta does not reach the cumulative threshold Ts in the detection periods W1 to W8 and reaches the cumulative threshold Ts in the detection period W9. Thus, at time t6 when the detection period W9 has elapsed, the current interruption processing (S250) is executed by the management part 130, and the overcurrent is interrupted.

Each of the detection periods W1 to W9 is shifted by cycle Y and is continuous while overlapping each other. In this way, the detection interval of the cumulative time Ta can be shortened, so that the current interruption processing (S250) can be quickly executed when a short circuit occurs.

FIG. 14 is a diagram illustrating current interruption conditions. The current interruption condition includes items of the current threshold Is, the cumulative threshold Ts, and the detection period W. There are four types, 1 to 4, of current interruption conditions, and the current threshold Is, the cumulative threshold Ts, and the detection period W are different among the conditions.

The current interruption condition 1 is a first condition for interrupting a short circuit between the two external terminals 51, 52. Each of the current interruption conditions 2 to 4 is a second condition for interrupting a short circuit of a load connected to the external terminals 51, 52

The management part 130 simultaneously performs the protection processing (S200 to S260) illustrated in FIG. 11 in parallel for the current interruption conditions 1 to 4 and performs the current interruption processing of S250 to interrupt the overcurrent when the cumulative time Ta reaches the cumulative threshold Ts under any of the current interruption conditions.

Other Embodiments

The present invention is not restricted to the embodiments described in the above description and the drawings, but, for example, the following embodiments are included in the technical scope of the present invention.

(1) In the above embodiment, the secondary battery 62 has been exemplified as an example of the energy storage device. The energy storage device is not limited to the secondary battery 62 but may be a capacitor. The secondary battery 62 is not limited to a lithium ion secondary battery but may be another nonaqueous electrolyte secondary battery. A lead-acid battery or the like can also be used. The energy storage device is not limited to a case where a plurality of energy storage devices are connected in series but may be connected in series or may have a single cell structure.

(2) In the above embodiments, the battery 50 has been used for a vehicle. The use of the battery 50 is not limited to a specific use. The battery 50 may be used for various uses such as a use for a moving body (a vehicle, a ship, an automatic guided vehicle (AGV), etc.) and an industrial use (an energy storage apparatus for an uninterruptible power system or a photovoltaic power generating system).

(3) In the above embodiment, the management part 130 has been provided inside the battery 50. The battery 50 only needs to include at least meters such as the current detection resistor 54 and the voltage detection circuit 110 and the current breaker 53, and the management part 130 may be outside the apparatus of the battery 50.

(4) In the above embodiment, the current breaker 53 has been disposed in the power line 55P of the positive electrode, and the current detection resistor 54 has been disposed in the power line 55N of the negative electrode. Conversely, the current detection resistor 53 may be disposed in the power line 55P of the positive electrode, and the current detection resistor 54 may be disposed in the power line 55N of the negative electrode.

(5) In the above embodiment, the protection processing (S200 to S260) has been simultaneously performed in parallel for the current interruption conditions 1 to 4, and the current interruption processing has been executed to interrupt the overcurrent when the cumulative time Ta reaches the cumulative threshold Ts under any of the current interruption conditions. In addition, the protection processing (S200 to S260) may be performed for any one of the four conditions of the current interruption conditions 1 to 4, and the current interruption processing may be executed to interrupt the overcurrent when the count value N reaches the cumulative threshold Ns. For example, when it is predicted that the external short circuit is likely to occur, the protection processing (S200 to S260) may be executed only for the current interruption condition 1, and the current interruption processing may be executed to interrupt the overcurrent when the count value N reaches the cumulative threshold Ns. When the current interruption condition is selected, a current interruption condition corresponding to a short circuit having a high occurrence probability may be selected. The number of current interruption conditions to be selected is not limited to one but may be two. That is, at least one or more conditions may be selected. The management part 130 may calculate a cumulative value of times during which the current I exceeds any of the current thresholds Is, and execute the current interruption processing when the calculated cumulative value exceeds one of the cumulative thresholds associated with the current threshold Is.

(6) In the above embodiment, the control part has calculated the cumulative value of the times during which the current exceeds any of the current thresholds, and executed the current interruption processing of interrupting the current when the calculated cumulative value exceeds a cumulative threshold associated with the current threshold. Alternatively, the control part may calculate a cumulative value of times during which the current exceeds any of the current thresholds, and cause the communication part to transmit an alarm signal when the calculated cumulative value exceeds a cumulative threshold associated with the current threshold.

Figure 15:
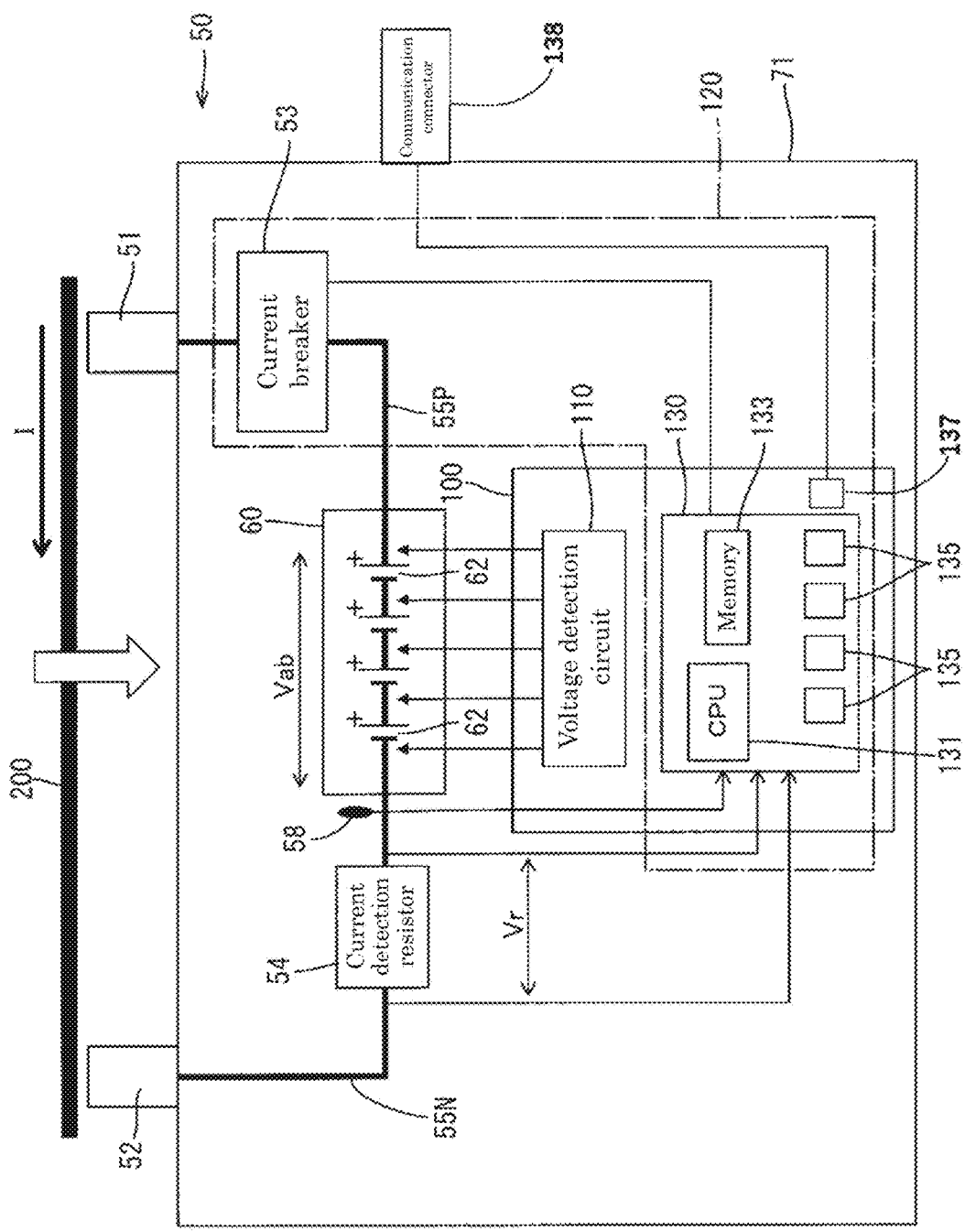
FIG. 15 is a block diagram illustrating the electrical configuration of the battery.

As illustrated in FIG. 15, the protective apparatus 120 may include a communication part 137 controlled by the management part 130. The housing 71 may include a communication connector 138 on the lid body 74, for example. The communication part 137 may be communicably connected to a controller of the vehicle outside the battery, such as an electronic control unit (ECU), via the communication connector 138.

Instead of executing the current interruption processing when the interruption condition is satisfied, the management part 130 notifies the ECU outside the battery that the interruption condition has been satisfied via the communication part 137, that is, transmits an alarm signal, and determines whether or not to execute the current interruption processing in cooperation with the ECU. Upon reception of the alarm signal, the ECU can proceed with preparation for the current interruption processing, processing for avoiding the current interruption processing such as stopping the operation of some loads, and other problem-solving processing.

(7) The present technique can be applied to a protection program for an energy storage device. The protection estimation program for the energy storage device is a program for causing a computer to execute the following processing. The protection estimation program is a program for causing the computer to execute current interruption processing in which a current interruption condition for interrupting a current of an energy storage device includes a plurality of conditions with different current thresholds and cumulative thresholds, and the control part calculates a cumulative value of times during which the current exceeds any one of the current thresholds, and interrupts the current when the calculated cumulative value exceeds one of the cumulative thresholds associated with the current threshold. The present technique can be applied to a recording medium in which the protection program for the energy storage device is recorded. The computer is, for example, the management part 130. The energy storage device is, for example, the secondary battery 62. The protection program can be recorded in a recording medium such as a read-only memory (ROM).

DESCRIPTION OF REFERENCE SIGNS

10: vehicle
50: battery (energy storage apparatus)
53: current breaker
54: current detection resistor
60: assembled battery
62: secondary battery (energy storage device)
120: protective apparatus
130: management part (control part)
131: CPU
133: memory
135: counter
N: count value (cumulative value)
Ns: cumulative threshold
Is: current threshold
Ta: cumulative time (cumulative value)
Ts: cumulative threshold

The invention claimed is:

1. A protective apparatus for an energy storage device, comprising:
   a current breaker that interrupts a current of the energy storage device; and
   a control part,
   wherein the control part calculates a cumulative value of times during which the current exceeds a current threshold, and executes current interruption processing of interrupting the current when the calculated cumulative value exceeds a cumulative threshold associated with the current threshold, and
   the control part counts, as the cumulative value, times during which the current continuously exceeds the current threshold, and in a case where the current falls from a state of exceeding the current threshold, the control part holds the cumulative value when a time during which the current is below the current threshold is equal to or shorter than a reset time.

2. A protective apparatus for an energy storage device, comprising:
   a current breaker that interrupts a current of the energy storage device; and
   a control part,
   wherein there are a plurality of conditions having different current thresholds and cumulative thresholds, and
   the control part calculates a cumulative value of times during which the current exceeds any one of the current thresholds, and executes current interruption processing of interrupting the current when the calculated cumulative value exceeds one of the cumulative thresholds associated with the current threshold,
   the current breaker is provided in a current path connecting the energy storage device and an external terminal, and
   the conditions at least include
   a first condition for determining that a short circuit of the external terminal occurs, and
   a second condition for determining that a short circuit of a load connected to the external terminal occurs.

3. An energy storage apparatus comprising:
an energy storage device; and
the protective apparatus according to claim 1.

4. The energy storage apparatus according to claim 3, wherein the energy storage apparatus is rated at 12 V.

5. A method for protecting an energy storage device, the method comprising:
- by a control part, calculating a cumulative value of times during which the current exceeds a current threshold, and executing current interruption processing of interrupting the current when the calculated cumulative value exceeds a cumulative threshold associated with the current threshold, and
- calculating, as the cumulative value, times during which the current continuously exceeds the current threshold, and in a case where the current falls from a state of exceeding the current threshold, holding the cumulative value when a time during which the current is below the current threshold is equal to or shorter than a reset time.

6. A non-transitory computer readable medium storing computer executable instructions according to the method of claim 5.

* * * * *